(12) United States Patent
Berger et al.

(10) Patent No.: US 9,162,533 B2
(45) Date of Patent: Oct. 20, 2015

(54) DIRECTIONAL TIRE TREAD WITH MODIFIED INCISIONS

(75) Inventors: Eric Berger, Loubeyrat (FR); Sébastien Fugier, Saint-Bonnet-Pres-Riom (FR); Mattieu Bonnamour, Pont Du Chateau (FR); Claude Audebert, Les Martres sur Morge (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 1265 days.

(21) Appl. No.: 13/002,461

(22) PCT Filed: Jul. 2, 2009

(86) PCT No.: PCT/EP2009/058319
§ 371 (c)(1),
(2), (4) Date: Feb. 10, 2011

(87) PCT Pub. No.: WO2010/000797
PCT Pub. Date: Jan. 7, 2010

(65) Prior Publication Data
US 2011/0155293 A1    Jun. 30, 2011

(30) Foreign Application Priority Data
Jul. 3, 2008 (FR) ..................................... 08 54517

(51) Int. Cl.
*B60C 11/12* (2006.01)

(52) U.S. Cl.
CPC ............... *B60C 11/12* (2013.01); *B60C 11/124* (2013.04); *B60C 11/1218* (2013.04); *B60C 11/1281* (2013.04)

(58) Field of Classification Search
CPC .............. B60C 11/124; B60C 11/1281; B60C 11/1204; B60C 11/1222; B60C 11/1218; B60C 11/12
USPC ............. 152/DIG. 3, 209.24, 209.23, 209.28, 152/209.18
IPC ........................................................ B60C 11/12
See application file for complete search history.

(56) References Cited

U.S. PATENT DOCUMENTS 5,127,455 A 7/1992 Remick
2002/0166613 A1 11/2002 Radulescu

FOREIGN PATENT DOCUMENTS

DE   1480932 A1 * 3/1969 .............. B60C 11/12
DE   4107547 A1 * 9/1991 .............. B60C 11/12
(Continued)

OTHER PUBLICATIONS

Machine translation of JP 2005-041339 (no date).*
(Continued)

*Primary Examiner* — Justin Fischer
*Assistant Examiner* — Philip N Schwartz
(74) *Attorney, Agent, or Firm* — Dickinson Wright PLLC

(57) ABSTRACT

Directional tire tread having a rolling surface, this tread being provided with a plurality of incisions bounded by mutually opposing walls, each of said walls entering the rolling surface in such a way as to form an edge called the leading edge of an element of material, corresponding to the edge that enters the contact patch first, and an edge called the trailing edge of the same element of material, corresponding to the edge that enters the contact patch after the leading edge, each incision comprising at least one segment bounded by mutually opposing walls that make, with a direction perpendicular to the rolling surface passing through the intersection of the incision with the rolling surface, a negative average angle α whose absolute value is less than 55°, this tread being characterized in that this segment of negative angle α exits the rolling surface via an enlarged end portion bounded by mutually opposing first and second faces, the angles of the first face and second face being positive and not equal to each other.

7 Claims, 4 Drawing Sheets

(56) References Cited

FOREIGN PATENT DOCUMENTS

| EP | 0810104 | A1 | | 12/1997 | |
|---|---|---|---|---|---|
| EP | 0846578 | A2 | | 6/1998 | |
| EP | 1170153 | A1 | | 1/2002 | |
| JP | 2005041339 | A | * | 2/2005 | .............. B60C 11/12 |
| WO | WO 94/21478 | | | 9/1994 | |

OTHER PUBLICATIONS

Machine translation of DE 4107547 (no date).*
Partial machine translation of DE 1480932 (no date).*
International Search Report mailed Aug. 5, 2009 for International Application No. PCT/EP2009/058319.

* cited by examiner

DIRECTIONAL TIRE TREAD WITH MODIFIED INCISIONS

The present invention relates to tire treads and more specifically treads comprising relief elements with incisions.

A tire tread comprises a rolling surface formed by a plurality of contact faces of relief elements bounded by grooves. These grooves are particularly useful for efficient draining of water present on the road surface over which a tire provided with this tread is rolling.

To improve the performance of a tread on a wet road surface, it is known practice to provide this tread with a plurality of incisions. An incision is a space bounded by two mutually opposing walls of material sufficiently close together for contact to be possible between said walls as they pass through the road contact patch. As a general rule, the width of the incisions is less than or equal to 2 mm and preferably less than 1 mm. These incisions extend in the direction of the thickness of the tread.

The virtue of the incisions is that they create additional edges on the rolling surface with which to cut through the film of water present on the road surface and thus create contact between the tread and the road surface, which is beneficial in terms of performance.

It is also known practice to form incisions with mutually opposing walls that can interact with each other to limit the decrease in stiffness which is related to the presence of the incisions themselves. In particular, it is known practice to form, on each of the opposing walls, reliefs that are able to interact with each other in such a way as to limit the movements of one wall relative to the other.

In normal operation on a vehicle, the tire and hence its tread are subjected to forces which are: either traction (to move a vehicle forwards), or braking (to reduce the speed of a vehicle). In order the better to adapt the tread to these forces, it is known practice to incline the incisions in a preferential direction with respect to the direction of travel of the tire. This preferential inclination of the incisions results in a tread whose direction of rotation is predetermined (a means visible on the tread or on the tire comprising said tread tells the user which way the tire absolutely must be fitted to his vehicle in order to obtain the desired improvement).

Document WO94/21478 shows incisions with no general inclination, each comprising a series of segments making respective angles $\alpha$ and $\beta$ with a perpendicular to the rolling surface (these angles being of opposite sign and of different absolute value).

It is also known practice, U.S. Pat. No. 5,127,455, to incline the incisions at an angle of at least 5° and not more than 45° relative to a direction perpendicular to the rolling surface. The inclination is such that the wall of the incision that cuts the rolling surface along the trailing edge (the edge that arrives in the contact patch after the leading edge facing it) is such that the angle made by this wall with the rolling surface is less than 90°.

Usage shows that in the early kilometers of use (before one third wear of the tread), braking on a dry road can cause localized wear to the trailing edge due partly to a mechanism whereby this trailing edge rolls over, causing pronounced wear to said edge. This localized wear reduces braking performance during the early kilometers of use.

The present invention seeks to disclose a solution capable of solving this problem of the early kilometers of travel. The invention provides a directional tire tread, that is a tread having a predetermined direction of rotation shown for example by a visual means indicating the direction of rotation. This tread has a rolling surface designed to be in contact with the road surface during travel and this tread is provided with a plurality of incisions bounded by mutually opposing walls, each of said walls exiting the rolling surface in such a way as to form an edge called the leading edge of an element of material, corresponding to the edge that enters the contact patch first, and an edge called the trailing edge of the same element of material, corresponding to the edge that enters the contact patch after the leading edge.

When the tread is rotating in the anticlockwise direction, each incision comprises at least one segment bounded by mutually opposing walls that make, with a direction perpendicular to the rolling surface passing through the intersection of the incision with the rolling surface, a negative average angle $\alpha$ whose absolute value is less than 55°.

This tread is characterized in that this segment of negative angle $\alpha$ exits the rolling surface via an end portion bounded by mutually opposing first and second faces, the first face of the end portion making an average angle A that is positive or zero and less than 55°, the second face of the end portion making an average angle F that is positive and greater than 10°.

With this arrangement on the part of the incision that interrupts the rolling surface, it is possible to control the distribution of contact pressures in a braking maneuver on dry ground and thus prevent the rolling and inverting of the trailing edge.

The angle F controls the distribution of contact pressures on the trailing edge during braking maneuvers. This angle also prevents or at least limits the rolling of the trailing edge. When engine torque is applied, it is the leading edge which is stressed.

The absolute value of the angle A of the leading edge must preferably be less than 20° in order for this edge to still be effective on snow.

In this way, it is simultaneously possible to control the distribution of the pressures between the tread and the road surface whether the tread is driving (engine torque applied) or braking (brake torque applied) owing to an incision which offers not only the possibility of locking in a manner appropriate to the particular applied stress, but also the possibility of optimum performance by preventing localized wear to the trailing edge.

The end part of the incisions preferably has a height He measured at right angles to the rolling surface, this height He being between 5% and 20% of the depth H of the incision.

In addition, in order to limit the differential wear between the leading edge and the trailing edge and therefore obtain even wear across the whole of the rolling surface, the difference (F-A) must be greater than or equal to 0°. Still more preferably, this difference (F-A) is greater than 10° and less than 45°.

This arrangement of an enlargement of the end of the incision is particularly suitable where said incision comprises an alternating series of portions inclined at a negative average angle $\alpha$ and portions inclined at a positive average angle $\beta$. The absolute values of these angles $\alpha$ and $\beta$ may be the same. Where the absolute values of these angles are different, it is advantageous if the angle $\alpha$ is between 5° and 45° and the angle $\beta$ between 45° and 90°.

In the case of this latter incision and in order to benefit at several levels of wear of the tread from the anti-roll effect of the trailing edge, it is advantageous for the angle F to be equal in value to the angle $\beta$.

Other features and advantages of the invention are shown in the description given below with reference to the appended drawings, which show, by way of non-restrictive examples, certain embodiments of the subject of the invention.

FIGS. 1A and 1B explain the sign conventions adopted in this description;

By convention, it has been decided to use identical reference signs to indicate identical elements throughout the figures, regardless of the variant considered.

Figure 1A:
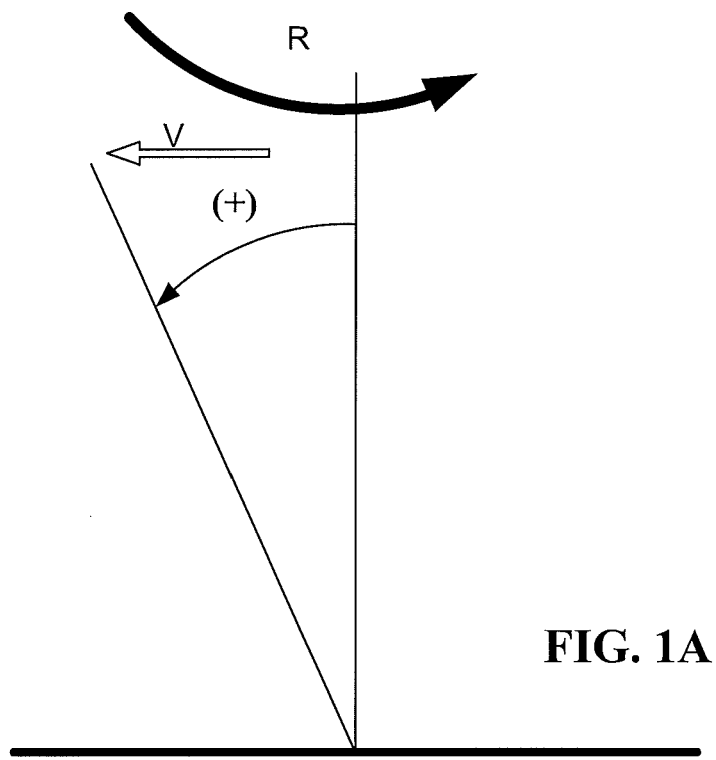

Rule of signs on the angles: this description defines the way in which the angles of the incisions are defined: the rolling surface is positioned at the bottom of a drawing and the direction of travel of the tire is from the right to the left of the drawing; a direction is said to be of positive angle with respect to a perpendicular to this rolling surface if the rotation that moves the perpendicular in this direction is anticlockwise (as shown in FIG. 1A).

Figure 1B:
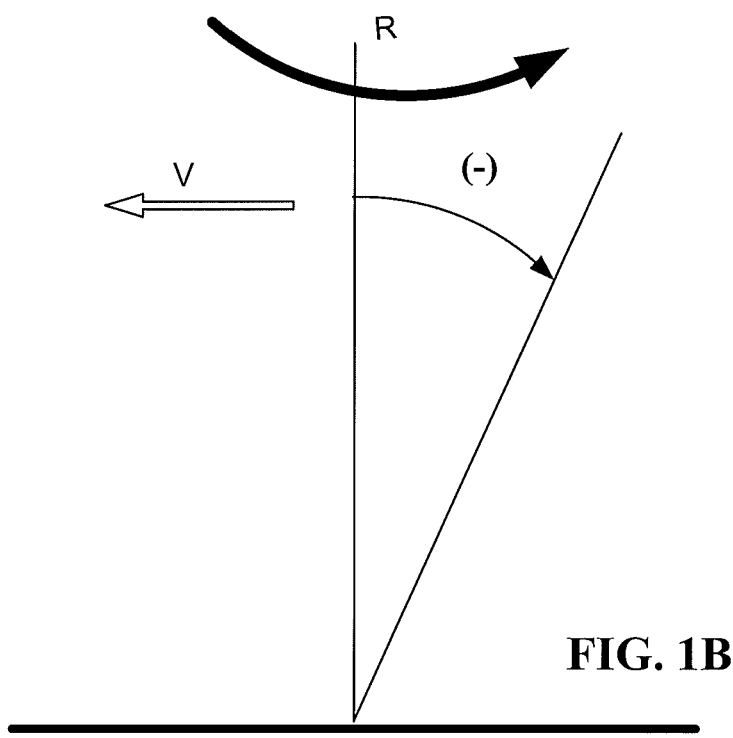

In contrast, a direction makes a negative angle if the rotation that moves the perpendicular in this direction is clockwise (see FIG. 1B).

Figure 2:
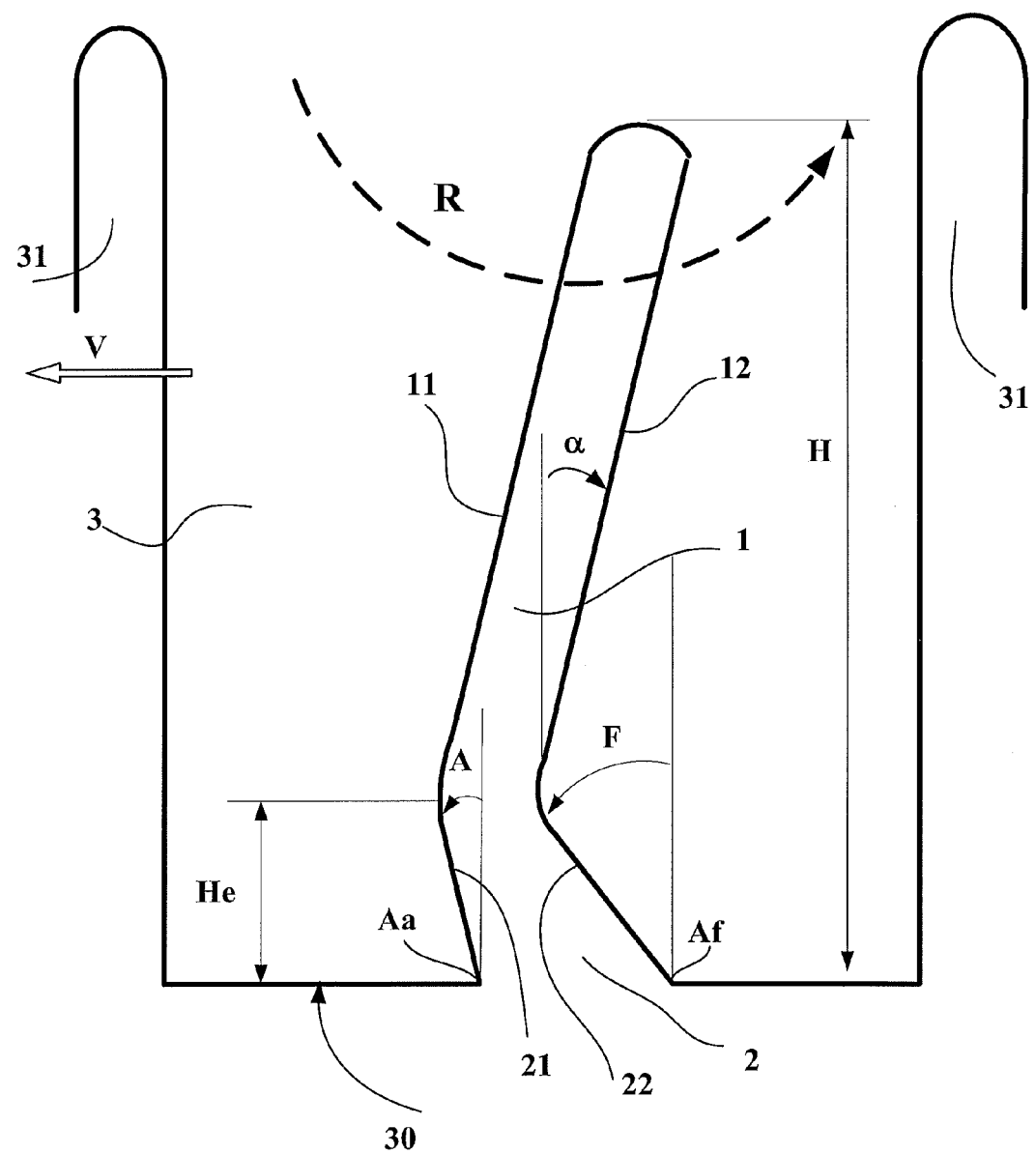
FIG. 2 shows a first variant of an incision according to the invention, this incision being inclined at an angle α.

FIG. 2 shows, in section on a cutting plane perpendicular to the rolling surface and containing the direction of travel, an incision 1 formed in a tread according to the invention.

This FIG. 2 shows, in section, a rubber block 3 bounded by grooves 31. This block 3 has a rolling surface 30 in the initial condition (i.e. on the new tread) interrupted by an incision 1 inclined at an average angle α with a perpendicular to the rolling surface. This angle is in this case negative and has an absolute value of 20°.

The incision 1 is bounded by two planar walls 11 and 12 facing each other across an average distance of 0.4 mm, these walls 11 and 12 being approximately parallel to each other.

The direction of travel is indicated by an arrow V (pointing from the right of the drawing to the left) and that of rotation of the tire by an arrow R (of anticlockwise direction).

The inclination α of the walls of the incision is such that the outermost part of the incision (meaning the part nearest the rolling surface) is forward of the radially inner end of said incision ("forward of" in the direction of the travel indicated by the arrow V).

This incision 1, of depth H (measured at right angles to the rolling surface), comprises two ends, a first or radially inner end, while a second or radially outer end is formed by an enlargement 2 of the incision.

This enlargement 2 of height He (measured at right angles to the rolling surface 30) is bounded by a first wall 21 and a second wall 22. Said two walls have, in the plane of the cross section, inclinations whose signs are the opposite of the inclination α of the incision 1.

The first wall 21 of the enlargement 2 is a continuation of the wall 11 of the incision and cuts the rolling surface 30 at an edge called the leading edge (Aa). The second wall 22 of the enlargement 2 continues the wall 12 of the incision and cuts the rolling surface 30 at an edge called the trailing edge (Af).

The angle A between the first wall 21 and a perpendicular to the rolling surface 30 is positive and less than 90°. In the example presented, this angle A is 10°.

The angle F between the second wall 22 and a perpendicular to the rolling surface 30 is positive and equal to 30°.

The difference between the angles A and F is 20°.

Figure 3:
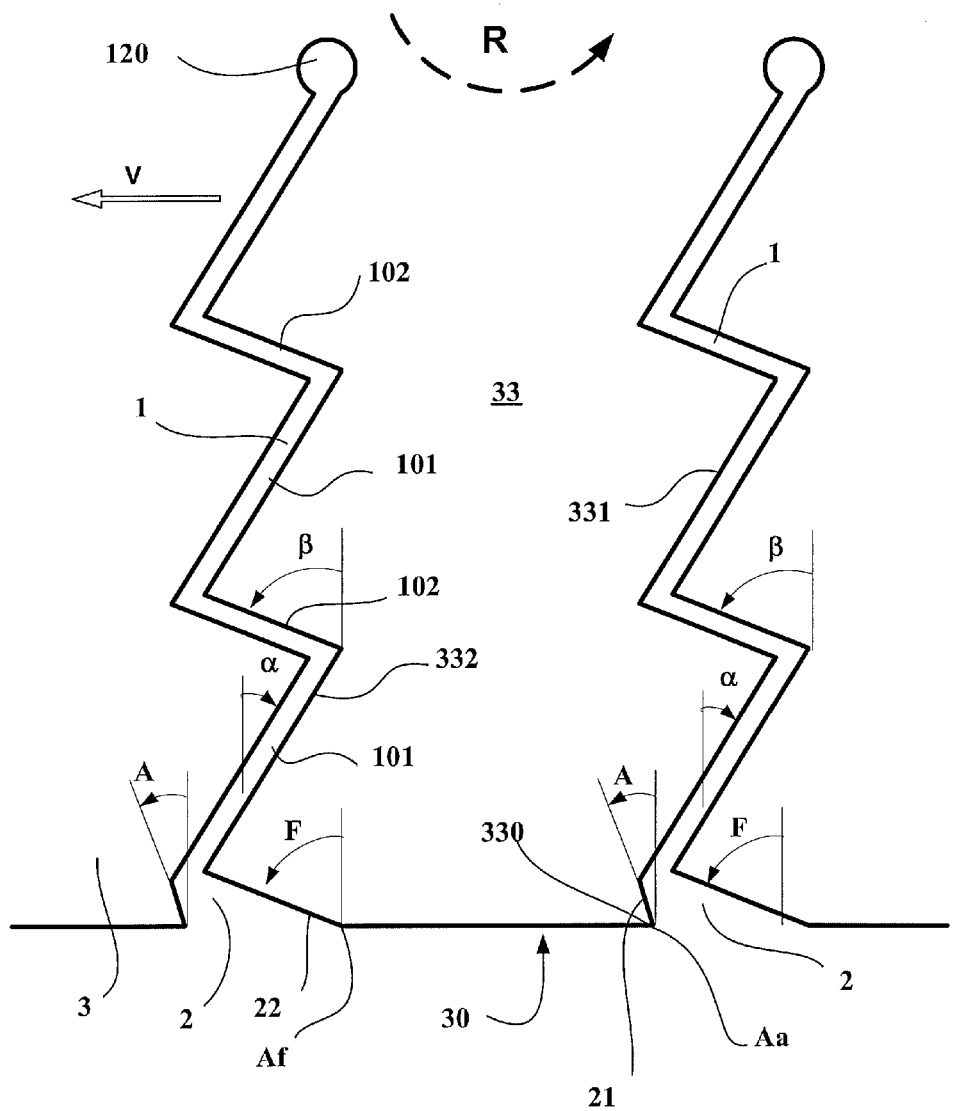
FIG. 3 shows a second variant of an incision according to the invention, comprising segments inclined at an angle α and segments inclined at an angle β.

FIG. 3 shows another variant of the invention in which incisions 1 with an enlargement 2 interrupting the rolling surface 30 of a common block 3 of a tread are each formed by a series of incision segments 101 inclined at an angle α, and incision segments 102 inclined at an angle β. These angles α and β are of opposite signs (in the present case angle α is negative and angle β is positive). The average width of the incisions is approximately constant in all the segments 101 and 102. To reduce stress concentrations at the end, each incision ends inside the tread in a circular part 120 whose diameter is greater than the average width of the incision.

The incisions depicted isolate a rubber element 33 having a lateral face (the leading face) 331 that cuts the rolling surface 30 at a leading edge Aa, and a lateral face (the trailing face) 332 that cuts the rolling surface 30 at a trailing edge Af.

Seen in section in the plane of FIG. 3, these two lateral faces 331 and 332 have identical profiles formed of a series of line segments inclined at an angle α (−25°) and line segments inclined at an angle β (+80°).

These profiles are distinguished from each other in that the leading face 331 ends, towards the exterior of the tread, in a part 21 that cuts the plane of the figure with an inclined line segment of positive angle A (20°), while the trailing face 332 ends in a part 22 that cuts the plane of the figure with an inclined line segment of positive angle F greater in absolute terms than the angle of the opposing face in such a way as to create both a point of rubber 330 with the rolling surface 30 and an enlargement 2 of the incision near the rolling surface in the new condition. This point of rubber is especially effective in acceleration. Each incision 1 ends inside the tread in an enlarged part 120 to avoid stress concentrations at the end.

Figure 4:
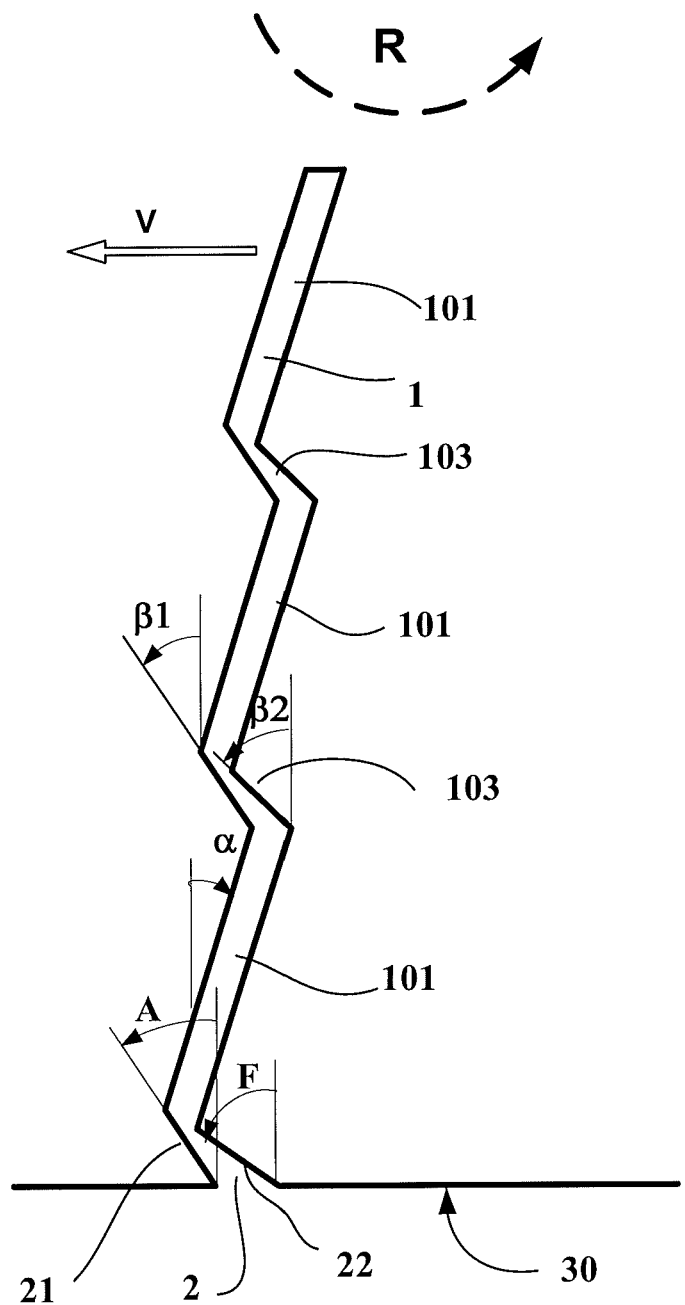
FIG. 4 shows a third variant of an incision according to the invention.

In a third variant of the incision according to the invention, shown in FIG. 4, the incision 1 comprises multiple incision segments 101 of inclination α. The nearest segment 101 to the rolling surface 30 in the new condition ends in an enlarged end portion 2 bounded by a wall 21 making an angle A and, facing it, a wall 22 making an angle F. Between two segments 101 of inclination α is an intermediate part 103 that essentially reproduces the shape of the end portion 2. Each intermediate part is bounded by a face making an angle β1 and an opposing face making an angle β2. The angle β1 is positive and less than 20° (in the non-restrictive case shown, this angle is approximately equal to the angle A). The angle β2 is positive and greater than the angle β1 (in the non-restrictive case shown, this angle is approximately equal to the angle F). The advantage of this kind of incision is that the configuration of the initial condition is recreated at different levels as the tread wears down. In this variant the forward direction is indicated in FIG. 4 by arrow V and the direction of rotation by arrow R.

In a variant that is not illustrated, the incision according to the invention includes means for inhibiting movements of the walls relative to each other (particularly on the portions of average inclination α). These inhibiting means may for example be formed by a plurality of low-amplitude corrugations around this average direction.

Having shown and described some of the variants of the invention, it is not the intention of the applicant to limit the invention to these variants only. For instance, although in all the variants described the walls defining the enlargement are of planar geometry, there is nothing to prevent a person skilled in the art adopting a non-planar shape for these walls of the enlargement.

The invention claimed is:

1. A directional tire tread, that is a tread having a predetermined direction of rotation shown by a means indicating the direction of rotation (R), wherein the tread comprises:
    a rolling surface designed to be in contact with the road surface during travel, and
    a plurality of incisions bounded by mutually opposing walls, each of said walls exiting the rolling surface in such a way as to form an edge called the leading edge (Aa) of an element of material, corresponding to the edge that enters the contact patch first, and an edge called the trailing edge (Af) of the same element of material, corresponding to the edge that enters the contact patch after the leading edge, wherein each incision, of height H measured perpendicular to the rolling surface, comprises:
- at least one segment bounded by mutually opposing walls that make, with a direction perpendicular to the rolling surface passing through the intersection of the incision with the rolling surface, a negative average angle $\alpha$ whose absolute value is less than 55°,
    - wherein this segment of negative angle $\alpha$ exits the rolling surface via an end portion bounded by mutually opposing first and second faces, and wherein
- the first face of the end portion is making, with a perpendicular to the rolling surface, an average angle A that is positive or zero and less than 55°,
- the second face of the end portion is making, with a perpendicular to the rolling surface, an average angle F that is positive and greater than 10°;
- a plurality of incision portions inclined at a negative average angle $\alpha$, each of said portions being connected to the next by an intermediate portion bounded by non-parallel faces of average angles $\beta 1$ and $\beta 2$,
    - wherein the angle $\beta 1$ is equal the angle A of the end portion of the incision and in that the angle $\beta 2$ is equal to the angle F of the end portion of the incision.

2. The tread according to claim 1, wherein the difference (F-A) is greater than or equal to 0°.

3. The tread according to claim 2, wherein the difference (F-A) is greater than 10° and less than 45°.

4. The tread according to claim 1, wherein the angle A is less than or equal to 20°.

5. The tread according to claim 1, wherein the end portion of the incision has a height He measured at right angles to the rolling surface, this height He being between 5% and 20% of the depth H of the incision.

6. The tread according to claim 1, wherein each incision comprises a series of portions inclined at a negative average angle $\alpha$ and portions inclined at a positive average angle $\beta$.

7. The tread according to claim 6, wherein the angle F is equal in value to the angle $\beta$.

* * * * *